(12) United States Patent
Miyanaga et al.

(10) Patent No.: US 9,484,773 B2
(45) Date of Patent: Nov. 1, 2016

(54) ENERGY HARVESTING APPARATUS AND ENERGY HARVESTING SYSTEM

(71) Applicant: ROHM Co., LTD., Kyoto (JP)

(72) Inventors: Koichi Miyanaga, Kyoto (JP); Jun Maede, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 455 days.

(21) Appl. No.: 14/058,977

(22) Filed: Oct. 21, 2013

(65) Prior Publication Data

US 2014/0175880 A1 Jun. 26, 2014

(30) Foreign Application Priority Data

Oct. 19, 2012 (JP) ................. 2012-231464

(51) Int. Cl.
*H02J 1/10* (2006.01)
*H02J 1/00* (2006.01)
*H02J 17/00* (2006.01)
*H02M 1/32* (2007.01)

(52) U.S. Cl.
CPC ............ *H02J 17/00* (2013.01); *H02J 1/102* (2013.01); *H02M 2001/322* (2013.01); *Y10T 307/391* (2015.04); *Y10T 307/461* (2015.04); *Y10T 307/718* (2015.04); *Y10T 307/858* (2015.04)

(58) Field of Classification Search
CPC .. H02J 1/102; H02J 17/00; H02M 2001/322; Y10T 307/391; Y10T 307/461; Y10T 307/718; Y10T 307/858

USPC .................................. 307/29, 130, 84, 38
See application file for complete search history.

(56) References Cited

U.S. PATENT DOCUMENTS

| 7,554,224 B2 | 6/2009 | Roberts | |
|---|---|---|---|
| 2006/0198167 A1* | 9/2006 | Nakamura | H02M 1/36 363/16 |
| 2013/0200727 A1* | 8/2013 | Yakovlev | H03M 1/60 307/126 |

FOREIGN PATENT DOCUMENTS

| JP | 2000059903 A | 2/2000 |
|---|---|---|
| JP | 2003199203 A | 7/2003 |
| JP | 2009528009 A | 7/2009 |

* cited by examiner

*Primary Examiner* — Jared Fureman
*Assistant Examiner* — Aqeel Bukhari
(74) *Attorney, Agent, or Firm* — Cantor Colburn LLP

(57) ABSTRACT

An energy harvesting apparatus includes: a capacitor configured to store energy generated by an energy harvesting element; and a switch connected to the capacitor and configured to switch energy supply from the capacitor to a load based on a capacitor voltage with which the capacitor is charged. An energy harvesting system includes: energy harvesting elements; energy harvesting apparatuses which are provided to respectively correspond to the energy harvesting elements; and a load as an energy supply destination connected to the energy harvesting apparatuses.

12 Claims, 24 Drawing Sheets

ENERGY HARVESTING APPARATUS AND ENERGY HARVESTING SYSTEM

CROSS-REFERENCE TO RELATED APPLICATION

This application is based upon and claims the benefit of priority from Japanese Patent Application No. 2012-231464, filed on Oct. 19, 2012, the entire contents of which are incorporated herein by reference.

TECHNICAL FIELD

The present disclosure relates to an energy harvesting apparatus and an energy harvesting system, and more particularly relates to an energy harvesting apparatus and an energy harvesting system which are capable of supplying energy generated by energy harvesting elements with efficiency.

BACKGROUND

In general, techniques for electromechanical equipment for converting mechanical vibration energy into electric energy are known. Further, techniques for a method of storing regenerative energy are also well known.

Conventional regenerative energy charging methods and regenerative energy storage device protection techniques had difficulty in supplying power generated by energy harvesting elements with efficiency.

SUMMARY

The present disclosure provides some embodiments of an energy harvesting apparatus and an energy harvesting system which are capable of supplying energy generated by an energy harvesting element with efficiency.

According to one embodiment of the present disclosure, there is provided an energy harvesting apparatus including: a capacitor configured to store energy generated by an energy harvesting element; and a switch connected to the capacitor and configured to switch energy supply from the capacitor to a load based on a capacitor voltage with which the capacitor is charged.

According to another embodiment of the present disclosure, there is provided an energy harvesting system including: an energy harvesting element; an energy harvesting apparatus connected to the energy harvesting element; and a load connected to the energy harvesting apparatus as an energy supply destination.

According to another embodiment of the present disclosure, there is provided an energy harvesting system including: a plurality of energy harvesting elements; a plurality of energy harvesting apparatuses provided to respectively correspond to the plurality of energy harvesting elements; and a load connected to the energy harvesting apparatuses as an energy supply destination.

DETAILED DESCRIPTION

Figure 1:
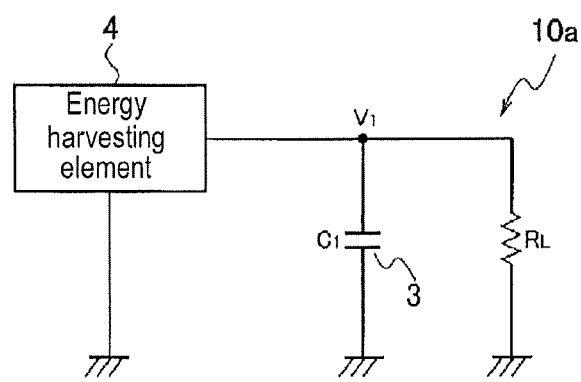
FIG. 1 is a schematic circuit diagram of an energy harvesting system.

Reference will now be made in detail to various embodiments, examples of which are illustrated in the accompanying drawings. In the following detailed description, numerous specific details are set forth in order to provide a thorough understanding of the present invention(s). However, it will be apparent to one of ordinary skill in the art that the present invention(s) may be practiced without these specific details. In other instances, well-known methods, procedures, systems, and components have not been described in detail so as not to unnecessarily obscure aspects of the various embodiments.

Embodiments of the present disclosure will now be described in detail with reference to the drawings. Throughout the drawings, the same or similar elements are denoted by the same or similar reference numerals.

The following embodiments are provided to illustrate devices and methods to embody the technical ideas of the present disclosure and are not limited to materials, forms, structures, arrangements and so on of elements detailed herein. The embodiments of the present disclosure may be modified in different ways without departing from the spirit and scope of the invention defined in the claims.

In the following embodiments, the term "energy harvesting element" refers to an element which can generate environmental energy such as vibration energy, radio wave energy, thermal energy, light energy and the like. A width of temporal variation may amount to, for example, several nanoseconds to several seconds, or several days depending on the type of energy harvester device. In addition, depending on the type of energy harvester device, a range of voltage variation may amount to, for example, several μV to several ten V and a level of power to be handled may amount to, for example, several μW to several ten W.

First Embodiment

As shown in FIG. 1, an energy harvesting system 10a has a basic configuration including an energy harvesting element 4, a capacitor 3 which is connected in parallel to the energy harvesting element 4 and stores energy generated by the energy harvesting element 4, and a load $R_L$ connected in parallel to the capacitor 3. Here, assuming that a capacitance of the capacitor 3 is $C_1$ and a capacitor voltage (a charging voltage of the capacitor 3) is $V_1$, energy stored in the capacitor $C_1$ is represented by $C_1 V_1^2/2$.

Figure 2:
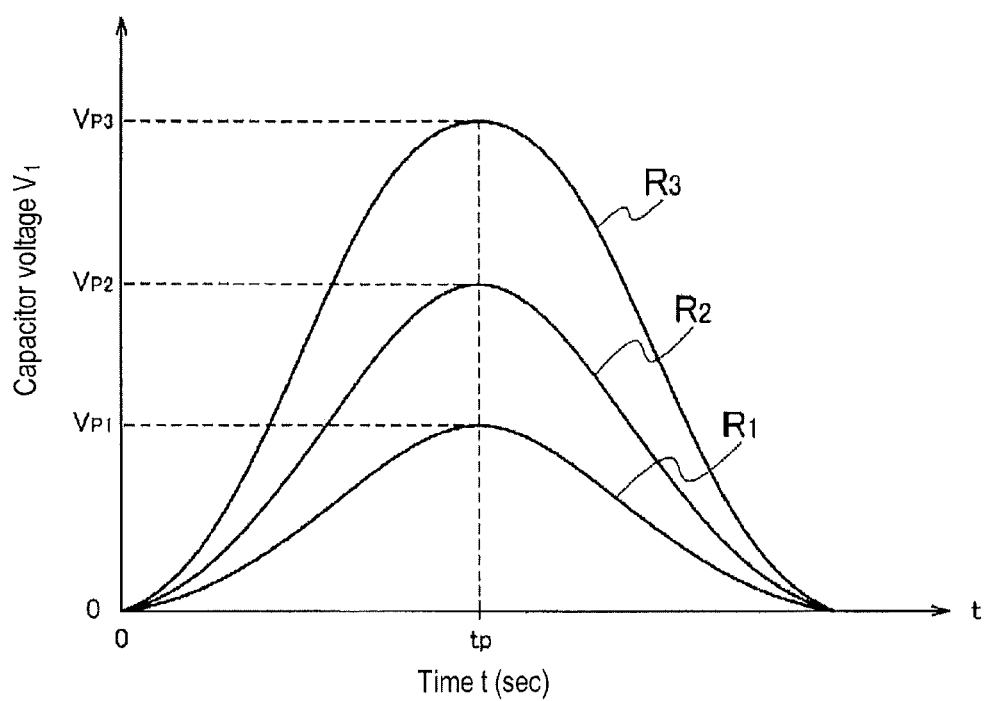
FIG. 2 is a view showing a waveform example of a temporal change in a capacitor voltage $V_1$ associated with power generation in the energy harvesting system.

FIG. 2 shows a waveform example of a temporal change in the capacitor voltage $V_1$ associated with power generation with values $R_1$, $R_2$ and $R_3$ ($R_1<R_2<R_3$) of the load $R_L$ as parameters in the energy harvesting system 10a.

In FIG. 2, the capacitor voltage $V_1$ shows peak values $V_{p1}$, $V_{p2}$ and $V_{p3}$ for values $R_1$, $R_2$ and $R_3$ ($R_1<R_2<R_3$) of the load $R_L$, respectively, at time $t_p$. Here, although times at which the peak values of the capacitor voltage $V_1$ can be obtained are set to the same time $t_p$, the times at which the peak values can be obtained may not necessarily coincide with each other.

In the energy harvesting system 10a, as shown in FIG. 2, as impedance of the load $R_L$ becomes smaller, the peak value of the capacitor voltage $V_1$ and the energy stored in the capacitor $C_1$ become smaller. As a result, an amount of energy supplied from the energy harvesting element 4 to the load $R_L 1$ becomes smaller. That is, in the energy harvesting element 4, power generation efficiency depends on impedance of an object to be supplied with generated energy.

Figure 3A:
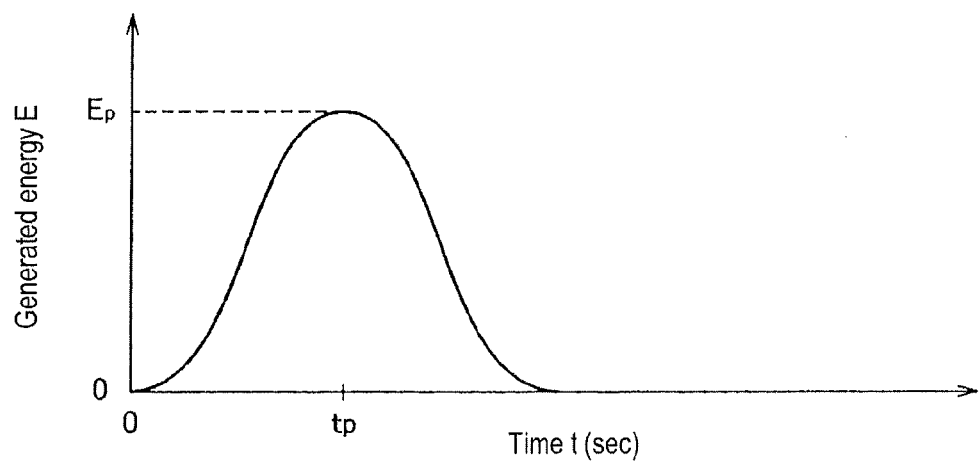
FIG. 3A is a view showing a waveform example of a temporal change in generated energy E in the energy harvesting system.

FIG. 3A shows a waveform example of a temporal change in generated energy E, for example, that has a peak value $E_p$ at time $t_p$, in the energy harvesting system 10a.

Figure 3B:
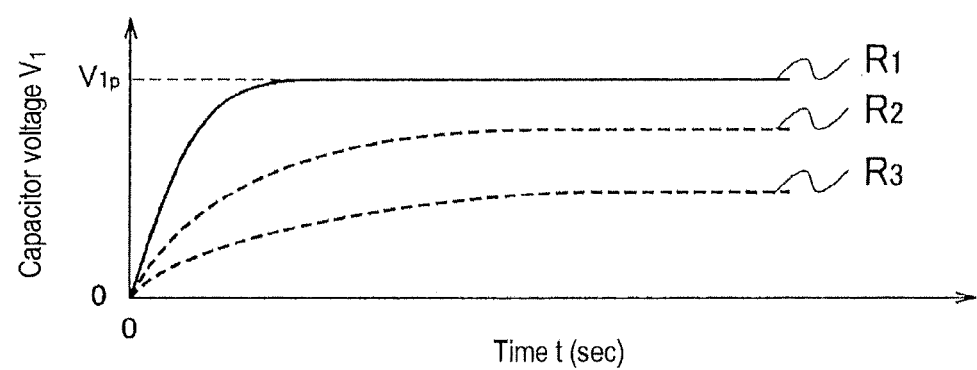
FIG. 3B is a view showing a waveform example of a temporal change in the capacitor voltage $V_1$ with values $R_1$, $R_2$ and $R_3$ of the load resistance $R_L$ as parameters in the energy harvesting system.

FIG. 3B shows a waveform example of a temporal change in the capacitor voltage $V_1$ with the load resistor $R_L$ as a parameter. In the energy harvesting system 10a, a RC time constant is varied depending on the value of the load resistance $R_L$, establishing a relationship of $R_1 C_1 < R_2 C_1 < R_3 C_1$. Accordingly, if the value of the load resistance $R_L$ is larger, it takes a longer time to charge the capacitor $C_1$.

Figure 4:
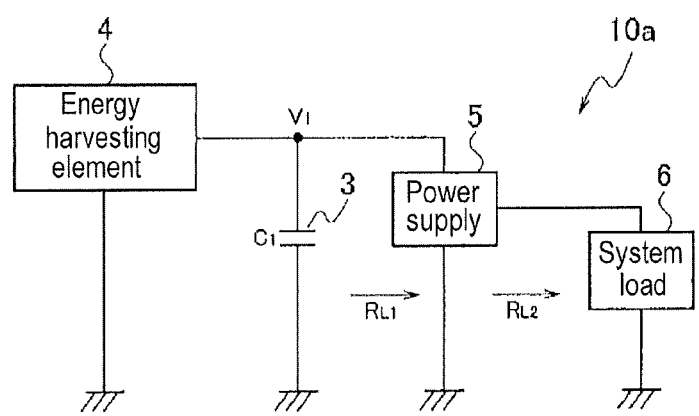
FIG. 4 is a detailed circuit diagram of the energy harvesting system.

FIG. 4 shows an example of a detailed circuit configuration of the energy harvesting system 10a. As shown in FIG. 4, this circuit configuration includes the energy harvesting element 4, the capacitor 3 which is connected in parallel to the energy harvesting element 4 and stores energy generated by the energy harvesting element 4, a power supply 5 connected in parallel to the capacitor 3, and a system load 6 connected to the power supply 5. Here, the impedance of the power supply 5 side including the system load 6, viewed from the capacitor 3, is denoted by $R_{L1}$ and the impedance of the system load 6 is denoted by $R_{L2}$.

In order to drive the load $R_L$ (including the impedance $R_{L1}$ of the power supply 5 side and the impedance $R_{L2}$ of the system load 6) properly, there is a need to supply required energy to the load $R_L$. However, if the impedance of the load $R_L$ is high, it takes time to charge the capacitor $C_1$, as shown in FIG. 3B. Accordingly, there is a need to shorten a time constant by switching the impedance of the load $R_L$ appropriately. That is, in order to supply sufficient energy to an electronic apparatus, there is a need to secure a short charging time of the capacitor $C_1$ and supply the energy generated by the energy harvesting element 4 and stored in the capacitor $C_1$ to the load $R_L$ with efficiency.

(Energy Harvesting System)

Figure 5:
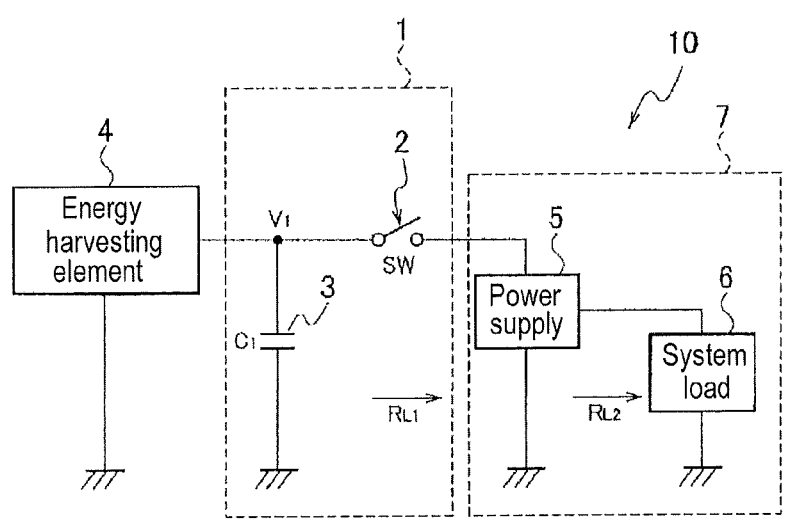
FIG. 5 is a schematic circuit diagram of an energy harvesting system according to a first embodiment.

As shown in FIG. 5, an energy harvesting system 10 according to a first embodiment includes an energy harvesting element 4, an energy harvesting apparatus 1 connected to the energy harvesting element 4, and a load 7 serving as an energy supply destination connected to the energy harvesting apparatus 1.

Here, the load 7 includes a power supply 5 and a system load 6 connected to the power supply 5. The power supply 5 has a function to stabilize a voltage supplied to the system load 6. An example of the power supply 5 may include a supply voltage stabilization power supply such as a DC-DC converter, a LDO (Low Drop Out) or the like. An example of the system load 6 may include an energy consuming device such as a mobile phone, a smart phone, a PDA (Personal Digital Assistant), an optical disc device, a digital camera, a mobile device such as a wireless communication device or the like, a vehicle, an industrial instrument, a medical instrument, parts thereof, etc.

(Energy Harvesting Apparatus)

Figure 6:
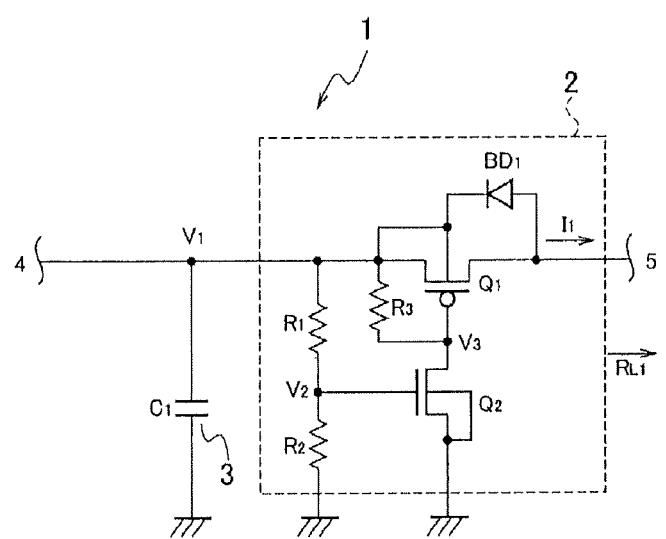
FIG. 6 is a schematic circuit diagram of an energy harvesting apparatus which can be applied to the energy harvesting system according to the first embodiment.

FIG. 6 is a schematic circuit diagram of the energy harvesting apparatus 1 which can be applied to the energy harvesting system 10 according to the first embodiment.

As shown in FIGS. 5 and 6, the energy harvesting apparatus 1 which can be applied to the energy harvesting system 10 according to the first embodiment includes a capacitor 3 for storing energy generated by the energy harvesting element 4, and a switch 2 for switching energy supply from the capacitor 3 to the load 7 based on a capacitor voltage $V_1$ with which the capacitor 3 is charged.

The switch 2 is connected between the capacitor 3 and the load 7 and switches supply of power from the capacitor 3 to the load 7 based on the capacitor voltage $V_1$.

As shown in FIG. 6, the switch 2 includes a first resistor $R_1$ and a second resistor $R_2$ connected in parallel to the capacitor 3.

As shown in FIG. 6, the switch 2 may include a first insulating gate p-channel field effect transistor (MOSFET (Metal-Oxide Semiconductor Field Effect Transistor)) $Q_1$ having a first source connected to the capacitor 3 and a first drain connected to the load 7, the first resistor $R_1$ and the second resistor $R_2$ which are connected in parallel to the capacitor 3 and divide the capacitor voltage $V_1$, a second n-channel MOSFET $Q_2$ having a second drain connected to a first gate of the first MOSFET $Q_1$, a second gate connected between the first resistor $R_1$ and the second resistor $R_2$, and a second source connected to a ground potential, and a third resistor $R_3$ connected between the first gate and first source of the first MOSFET $Q_1$. Here, a gate voltage $V_2$ generated by the division of the capacitor voltage $V_1$ by the first resistor $R_1$ and the second resistor $R_2$ is represented by $R_2 \cdot V_1/(R_1+R_2)$. In addition, a voltage of the first gate of the first MOSFET $Q_1$ and a voltage of the second drain of the second MOSFET $Q_2$ are represented by a drain voltage $V_3$. In FIG. 6, $BD_1$ denotes a back gate body diode of the first MOSFET $Q_1$. When the capacitor 3 is charged with the capacitor voltage $V_1$ and the first MOSFET $Q_1$ is turned off, a reverse bias is applied between the gate and source of the first MOSFET $Q_1$, between the drain and source of the first MOSFET $Q_1$ and to the back gate body diode $BD_1$.

The resistors $R_1$ and $R_2$ have a resistance of predetermined impedance or higher. That is, each of the resistors $R_1$ and $R_2$ has a resistance of predetermined value or higher and thus the addition of the resistance of the resistors $R_1$ and the resistance of the resistor $R_2$ becomes equal to or larger than the predetermined impedance.

The switch 2 can control turning-on/off of the second MOSFET $Q_2$ based on a magnitude relationship between the gate voltage $V_2$ ($=R_2 \cdot V_1/(R_1+R_2)$) generated by the voltage division and a threshold voltage $V_{th2}$ of the second n-channel MOSFET $Q_2$.

Figure 7A:
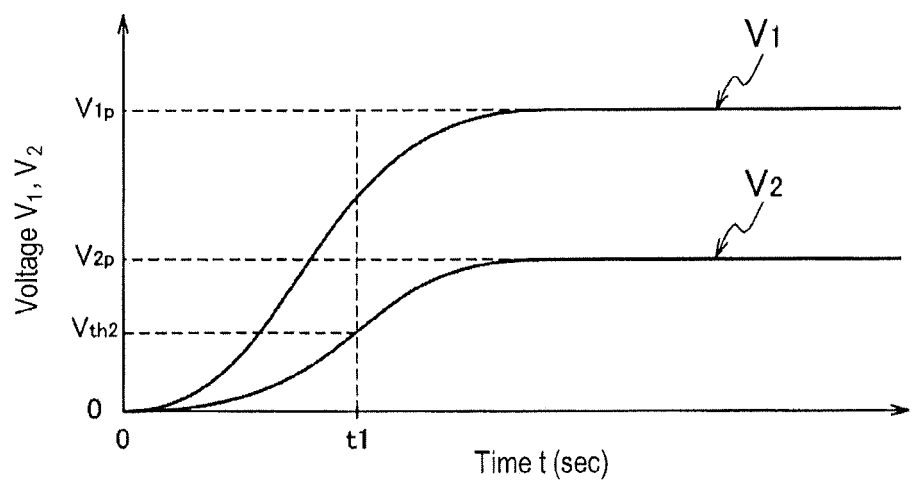
FIG. 7A is a view showing an operation waveform example of a capacitor voltage $V_1$ and a gate voltage $V_2$ in the energy harvesting apparatus which can be applied to the energy harvesting system according to the first embodiment.
Figure 7B:
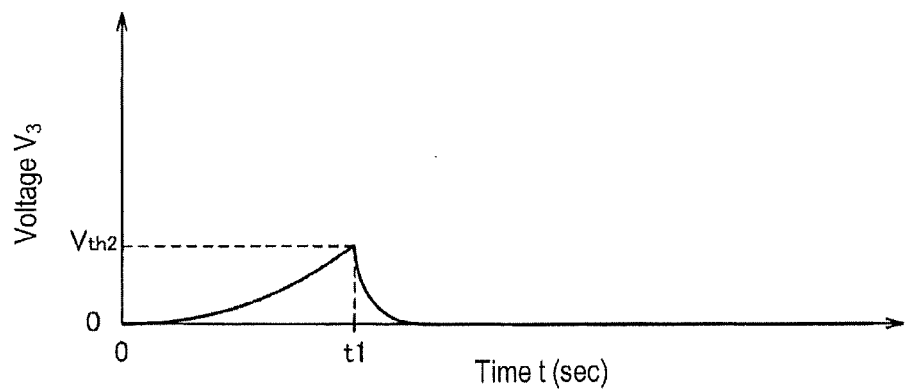
FIG. 7B is a view showing an operation waveform example of a drain voltage $V_3$ in the energy harvesting apparatus which can be applied to the energy harvesting system according to the first embodiment.
Figure 7C:
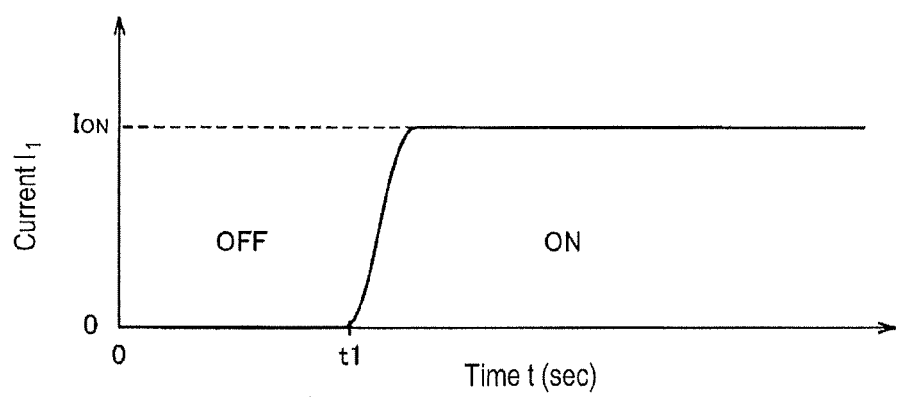
FIG. 7C is a view showing an operation waveform example of a current $I_1$ supplied to a load in the energy harvesting apparatus which can be applied to the energy harvesting system according to the first embodiment.

FIGS. 7A to 7C show operation waveform examples of the capacitor voltage $V_1$ and the gate voltage $V_2$, an operation waveform example of the drain voltage $V_3$, and an operation waveform example of a current $I_1$ supplied to the load 7, respectively, in the energy harvesting apparatus 1 which can be applied to the energy harvesting system 10 according to the first embodiment.

Figure 8:
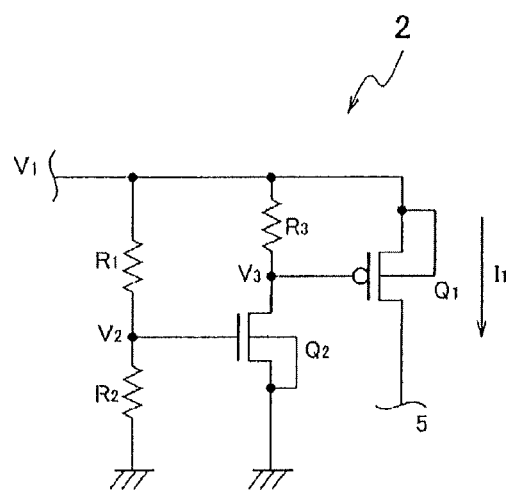
FIG. 8 is a schematic circuit diagram of the switch of FIG. 6.

FIG. 8 is a schematic circuit diagram of the switch 2 of FIG. 6.

In the energy harvesting system 10 according to the first embodiment, the capacitor voltage $V_1$ can be triggered in a high impedance condition and thus the later stage can be efficiently triggered.

First, as shown in FIGS. 7A and 7B, the gate voltage $V_2$ does not reach the threshold voltage $V_{th2}$ of the second MOSFET $Q_2$ until time t1. Accordingly, the second MOSFET $Q_2$ remains turned off.

Subsequently, as shown in FIGS. 7A and 7B, the capacitor voltage $V_1$ rises over time t. When the gate voltage $V_2$ ($=R_2 \cdot V_1/(R_1+R_2)$) becomes higher than the voltage $V_{th2}$ of the second MOSFET $Q_2$ at time t1, the second MOSFET $Q_2$ is turned on. As a result, since the drain voltage $V_3$ becomes the ground potential and a gate potential of the first gate of the first MOSFET $Q_1$ becomes equal to the drain voltage $V_3$ of the second MOSFET $Q_2$, the first MOSFET $Q_1$ is turned on. As a result, the energy stored in the capacitor 3 is supplied to the load 7 via the first MOSFET $Q_1$. Here, as shown in FIG. 7C, the supply current $I_1$ to the load 7, which flows through the first MOSFET $Q_1$, is represented by an ON-current $I_{ON}$ under the turning-on state of the first MOSFET $Q_1$.

Figure 9A:
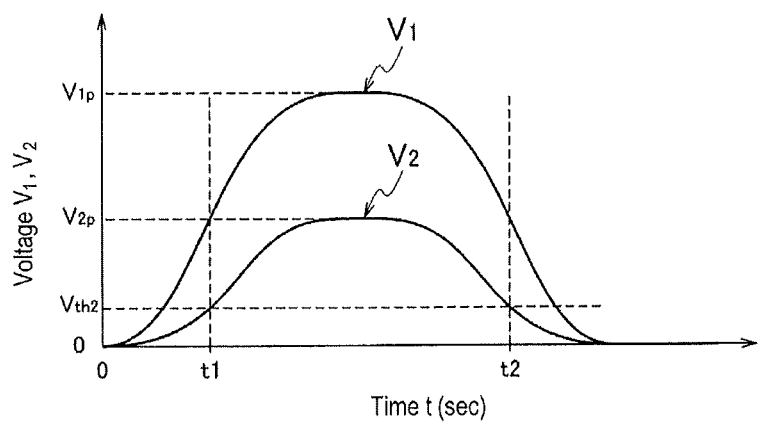
FIG. 9A is a view showing an on/off operation waveform example of the capacitor voltage $V_1$ and the gate voltage $V_2$ in the energy harvesting apparatus which can be applied to the energy harvesting system according to the first embodiment.
Figure 9B:
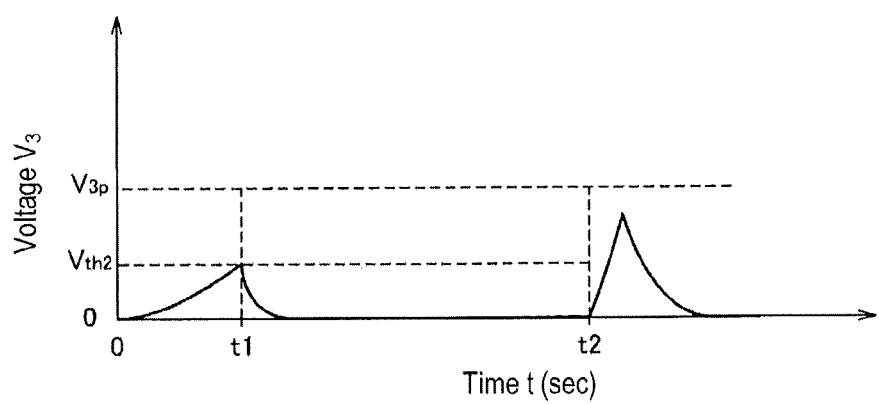
FIG. 9B is a view showing an on/off operation waveform example of the drain voltage $V_3$ in the energy harvesting apparatus which can be applied to the energy harvesting system according to the first embodiment.
Figure 9C:
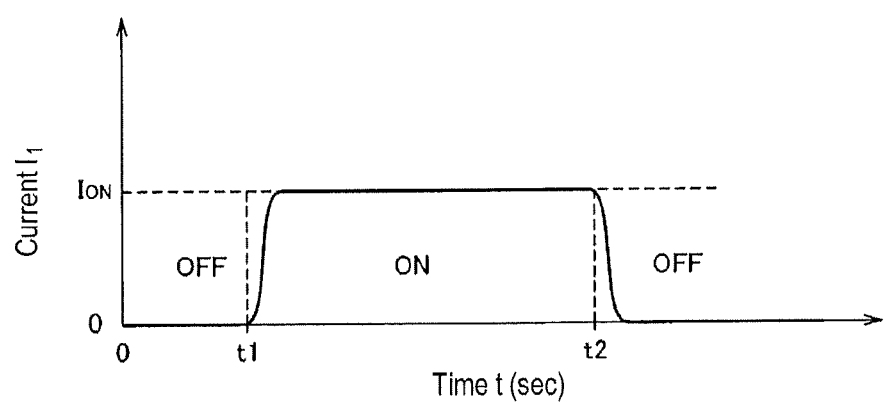
FIG. 9C is a view showing an on/off operation waveform example of a current $I_1$ supplied to the load in the energy harvesting apparatus which can be applied to the energy harvesting system according to the first embodiment.

FIGS. 9A to 9C show an on/off operation waveform example of the capacitor voltage $V_1$ and the gate voltage $V_2$, an on/off operation waveform example of the drain voltage $V_3$, and an on/off operation waveform example of the current $I_1$ supplied to the load 7, respectively, in the energy harvesting apparatus 1 which can be applied to the energy harvesting system 10 according to the first embodiment. The ON operation in FIGS. 9A to 9C is the same as that in FIGS. 7A to 7C and therefore, explanation thereof will not be repeated and an OFF operation will only be described.

As shown in FIGS. 9A and 9B, the capacitor voltage $V_1$ charged in the capacitor 3 decreases over time t. When the gate voltage $V_2$ becomes lower than the voltage $V_{th2}$ of the second MOSFET $Q_2$, the second MOSFET $Q_2$ is turned off, the drain voltage $V_3$ becomes a potential of a high level higher than the voltage $V_{th2}$, and the first p-channel MOSFET $Q_1$ is turned off. As a result, as shown in FIG. 9C, the supply current $I_1$ to the load 7, which flows through the first MOSFET $Q_1$, is cut off to stop the supply of current to the load 7. In addition, since a waveform of the drain voltage $V_3$ after time t2 converges to 0 V, it becomes equal to the waveform of the capacitor voltage $V_1$, as shown in FIG. 9B. This is because a gate-source voltage $V_{GS}$ of the first MOSFET $Q_1$ becomes 0 V and the first MOSFET $Q_1$ is turned off at time t2.

FIGS. 10A to 10D show a continuous waveform example of the gate voltage $V_2$, a continuous waveform example of energy $E_1$ stored in the capacitor 3, a continuous operation waveform example of the supply current $I_1$ to the load 7, and a continuous operation waveform example of energy $E_L$ supplied to the load 7, respectively, in the energy harvesting system 10 according to the first embodiment.

Figure 10A:
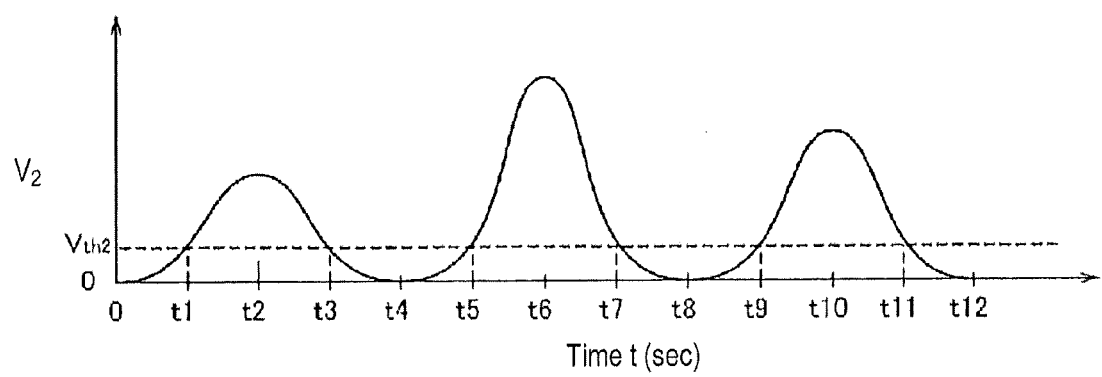
FIG. 10A is a view showing a continuous waveform example of the gate voltage $V_2$ in the energy harvesting system according to the first embodiment.
Figure 10B:
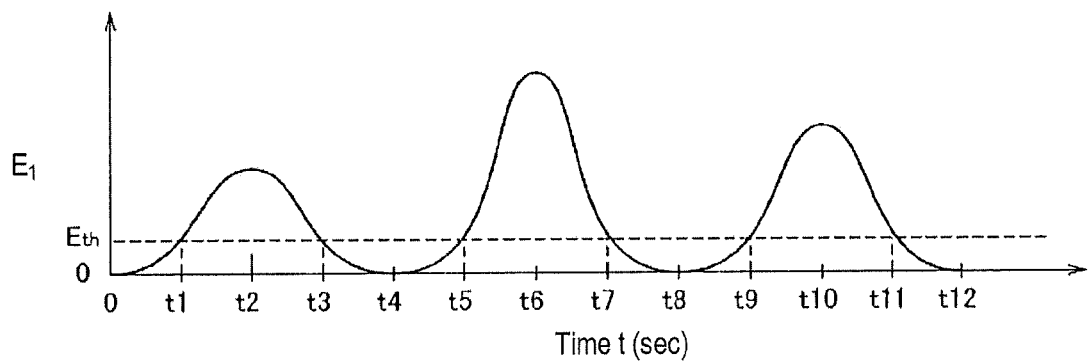
FIG. 10B is a view showing a continuous waveform example of energy $E_1$ stored in the capacitor in the energy harvesting system according to the first embodiment.
Figure 10C:
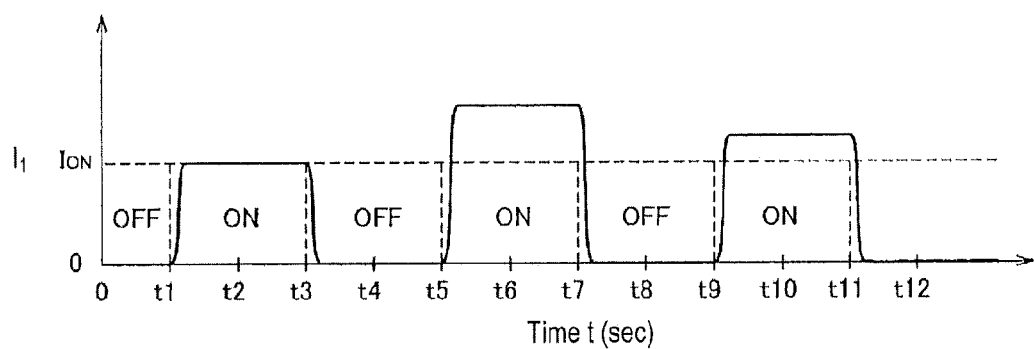
FIG. 10C is a view showing a continuous operation waveform example of a supply current $I_1$ to the load in the energy harvesting system according to the first embodiment.
Figure 10D:
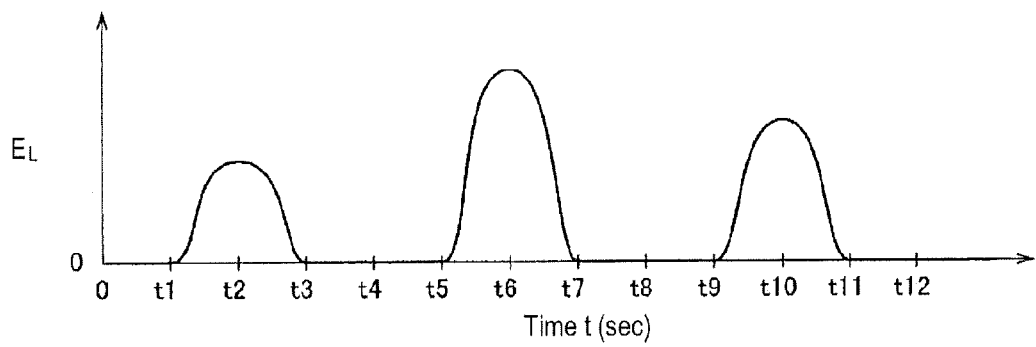
FIG. 10D is a view showing a continuous operation waveform example of energy $E_L$ supplied to the load in the energy harvesting system according to the first embodiment.

When the continuous waveform of the gate voltage $V_2$ is varied as shown in FIG. 10A according to a continuous operation of the capacitor voltage V1 and the gate voltage $V_2$ becomes higher than the threshold voltage $V_{th2}$ of the second MOSFET $Q_2$, the second MOSFET $Q_2$ is turned on, the first MOSFET $Q_1$ is also turned on, and the supply current $I_1$ to the load 7 becomes the ON-current $I_{ON}$ or higher. As a result, the supply energy $E_L$ to the load 7 is represented by the continuous waveform example as shown in FIG. 10D.

With the energy harvesting system 10 according to the first embodiment, since energy can be supplied to the load 7 under a high impedance state after the capacitor 3 is sufficiently charged, the energy generated by the energy harvesting element 4 can be efficiently supplied to the load 7.

According to the first embodiment, it is possible to provide an energy harvesting apparatus and an energy harvesting system which are capable of supplying the energy generated by the energy harvesting element with efficiency.

Second Embodiment (Energy Harvesting System)

Figure 11:
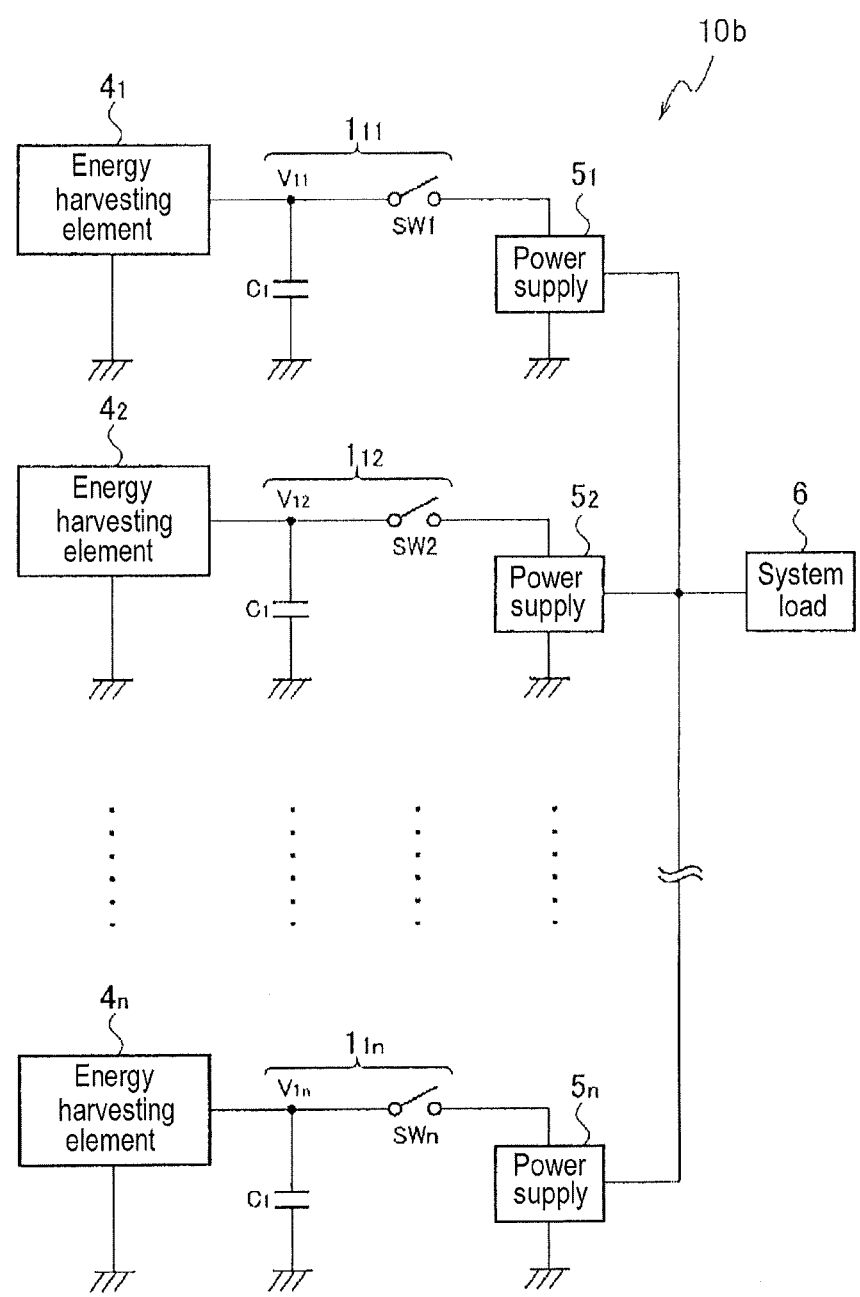
FIG. 11 is a schematic circuit diagram of an energy harvesting system according to a second embodiment.

As shown in FIG. 11, a schematic circuit configuration of an energy harvesting system 10b according to a second embodiment includes a plurality of energy harvesting elements $4_1, 4_2, \ldots, 4_n$, a plurality of energy harvesting apparatuses $1_{11}, 1_{12}, \ldots, 1_{1n}$ respectively connected to the plurality of energy harvesting elements $4_1, 4_2, \ldots, 4_n$ and provided to respectively correspond to the plurality of energy harvesting elements $4_1, 4_2, \ldots, 4_n$, a plurality of power supplies $5_1, 5_2, \ldots, 5_n$ serving as energy supply destinations respectively connected to the energy harvesting apparatuses $1_{11}, 1_{12}, \ldots, 1_{1n}$, and a system load 6.

Here, as shown in FIG. 11, loads in the energy harvesting system 10b include the plurality of power supplies $5_1, 5_2, \ldots, 5_n$ respectively connected to the plurality of energy harvesting apparatuses $1_{11}, 1_{12}, \ldots, 1_{1n}$, and the system load 6 which is connected in common to the plurality of power supplies $5_1, 5_2, \ldots, 5_n$ and consumes power.

Each of the power supplies $5_1, 5_2, \ldots, 5_n$ has a function to stabilize a voltage supplied to the system load 6. An example of the power supplies $5_1, 5_2, \ldots, 5_n$ may include a supply voltage stabilization power supply such as a DC-DC converter, a LDO (Low Drop Out) or the like.

An example of the system load 6 may include an energy consuming device such as a mobile phone, a smart phone, a PDA, an optical disc device, a digital camera, a mobile device such as a wireless communication device or the like, a vehicle, an industrial instrument, a medical instrument, parts thereof, etc.

Each of the plurality of energy harvesting apparatuses $1_{11}, 1_{12}, \ldots, 1_{1n}$ includes a capacitor $C_1$ and a switch SW1, SW2, . . . , SWn connected to the capacitor $C_1$. A capacitor voltage $V_{11}, V_{12}, \ldots, V_{1n}$ is generated in each capacitor $C_1$ according to a power generation state of the plurality of energy harvesting elements $4_1, 4_2, \ldots, 4_n$, and energy is supplied from one or more of the plurality of energy harvesting elements $4_1, 4_2, \ldots, 4_n$ to the loads (i.e., the power supplies $5_1, 5_2, \ldots, 5_n$ and the system load 6) according to a switching operation of the switch SW1, SW2, . . . , SWn.

With the energy harvesting system 10 according to the second embodiment, since energy can be supplied to the loads (the power supplies $5_1, 5_2, \ldots, 5_n$ and the system load 6) under a high impedance state after each capacitor 3 of the plurality of energy harvesting apparatuses $1_{11}, \ldots, 1_{1i}, \ldots, 1_{1n}$ provided to respectively correspond to the plurality of energy harvesting elements $4_1, \ldots, 4_i, \ldots, 4_n$ is sufficiently charged, the energy generated by the plurality of energy harvesting elements $4_1, \ldots, 4_i, \ldots, 4_n$ can be efficiently supplied to the loads.

According to the second embodiment, it is possible to provide an energy harvesting apparatus and an energy harvesting system which are capable of supplying the energy generated by the plurality of energy harvesting elements with efficiency.

Third Embodiment

Figure 12:
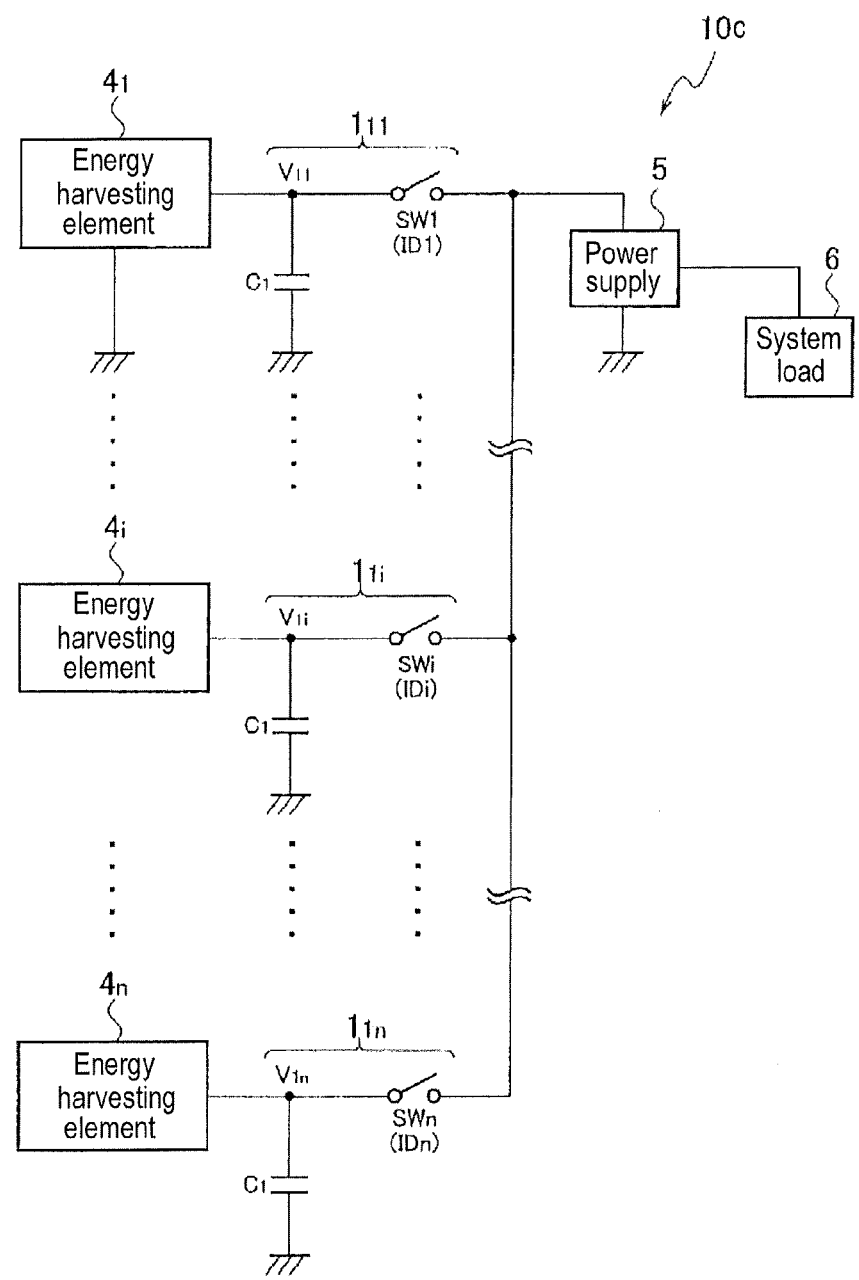
FIG. 12 is a schematic circuit diagram of an energy harvesting system according to a third embodiment.

As shown in FIG. 12, a schematic circuit configuration of an energy harvesting system 10c according to a third embodiment includes a plurality of energy harvesting elements $4_1, \ldots, 4_i, \ldots, 4_n$, a plurality of energy harvesting apparatuses $1_{11}, \ldots, 1_{1i}, \ldots, 1_{1n}$ provided to respectively correspond to the plurality of energy harvesting elements $4_1, \ldots, 4_i, \ldots, 4_n$, a power supply 5 serving as an energy supply destination connected in common to the energy harvesting apparatuses $1_{11}, \ldots, 1_{1i}, \ldots, 1_{1n}$, and a system load 6.

Here, as shown in FIG. 12, loads in the energy harvesting system 10c include the power supply 5 connected in common to the plurality of energy harvesting apparatuses $1_{11}, \ldots, 1_{1i}, \ldots, 1_{1n}$, and the system load 6 which is connected to the power supply 5 and consumes power.

In the third embodiment, since the power supply 5 is connected in common to the plurality of energy harvesting apparatuses $1_{11}, \ldots, 1_{1i}, \ldots, 1_{1n}$, it is possible to prevent an interference that may occur between a plurality of power supplies $5_1, 5_2, \ldots, 5_n$ as shown in FIG. 11.

The power supply 5 has a function to stabilize a voltage supplied to the system load 6. An example of the power supply 5 may include a supply voltage stabilization power supply such as a DC-DC converter, a LDO (Low Drop Out) or the like.

An example of the system load 6 may include an energy consuming device such as a mobile phone, a smart phone, a PDA, an optical disc device, a digital camera, a mobile device such as a wireless communication device or the like, a vehicle, an industrial instrument, a medical instrument, parts thereof, etc.

Figure 13:
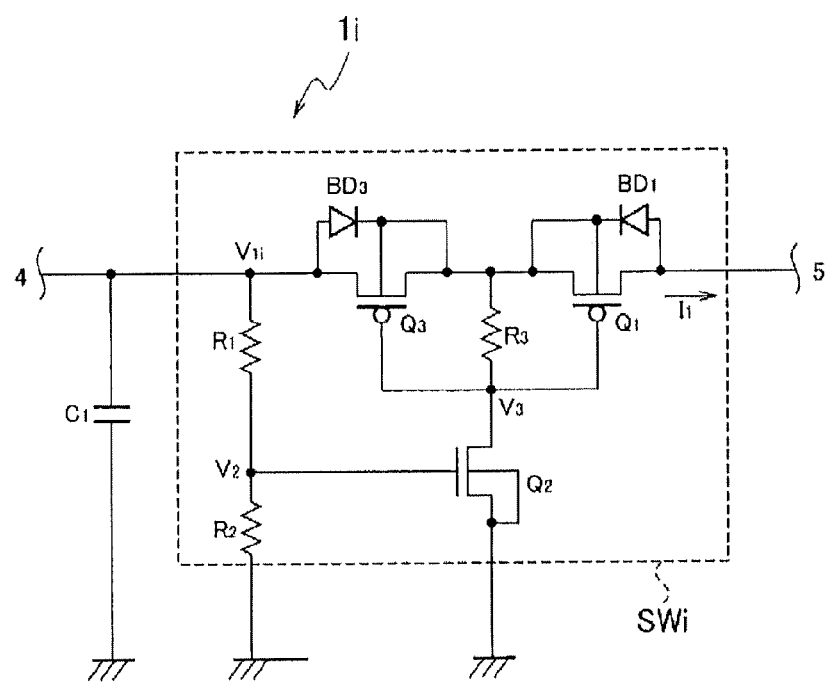
FIG. 13 is a schematic circuit diagram of an energy harvesting apparatus which can be applied to the energy harvesting system according to the third embodiment.

FIG. 13 is a schematic circuit diagram of an energy harvesting apparatus $1_i$ which can be applied to the energy harvesting system 10c according to the third embodiment.

In the energy harvesting apparatus $1_i$ which can be applied to the energy harvesting system 10c according to the third embodiment, as shown in FIG. 13, a switch SWi further includes a third p-channel MOSFET $Q_3$ which is interposed between the first source and the capacitor $C_1$ and has a third drain connected to the capacitor $C_1$, a third source connected to the first source, and a third gate connected to the first gate, in comparison with the configuration of the switch 2 shown in FIG. 6.

In the configuration of the switch 2 shown in FIG. 6, if a short circuit occurs between the first gate and first source of the p-channel MOSFET $Q_1$, a current may flow backward since the p-channel MOSFET $Q_1$ is turned on. However, in the configuration of the switch SWi shown in FIG. 13, it is possible to prevent a current from flowing backward since the switch SWi further includes the third p-channel MOSFET $Q_3$.

In the configuration of the switch 2 shown in FIG. 13, although the drain voltage $V_3$ is at a zero potential when the switch SW1 is switched on, it is possible to prevent a current from flowing backward due to an effect of a back gate body diode $BD_3$ of the third p-channel MOSFET $Q_3$.

In addition, in the configuration of the switch SWi shown in FIG. 13, when the switch SWi is switched off, the drain voltage $V_3$ has the same potential as a gate voltage $V_{1i}$.

Figure 14:
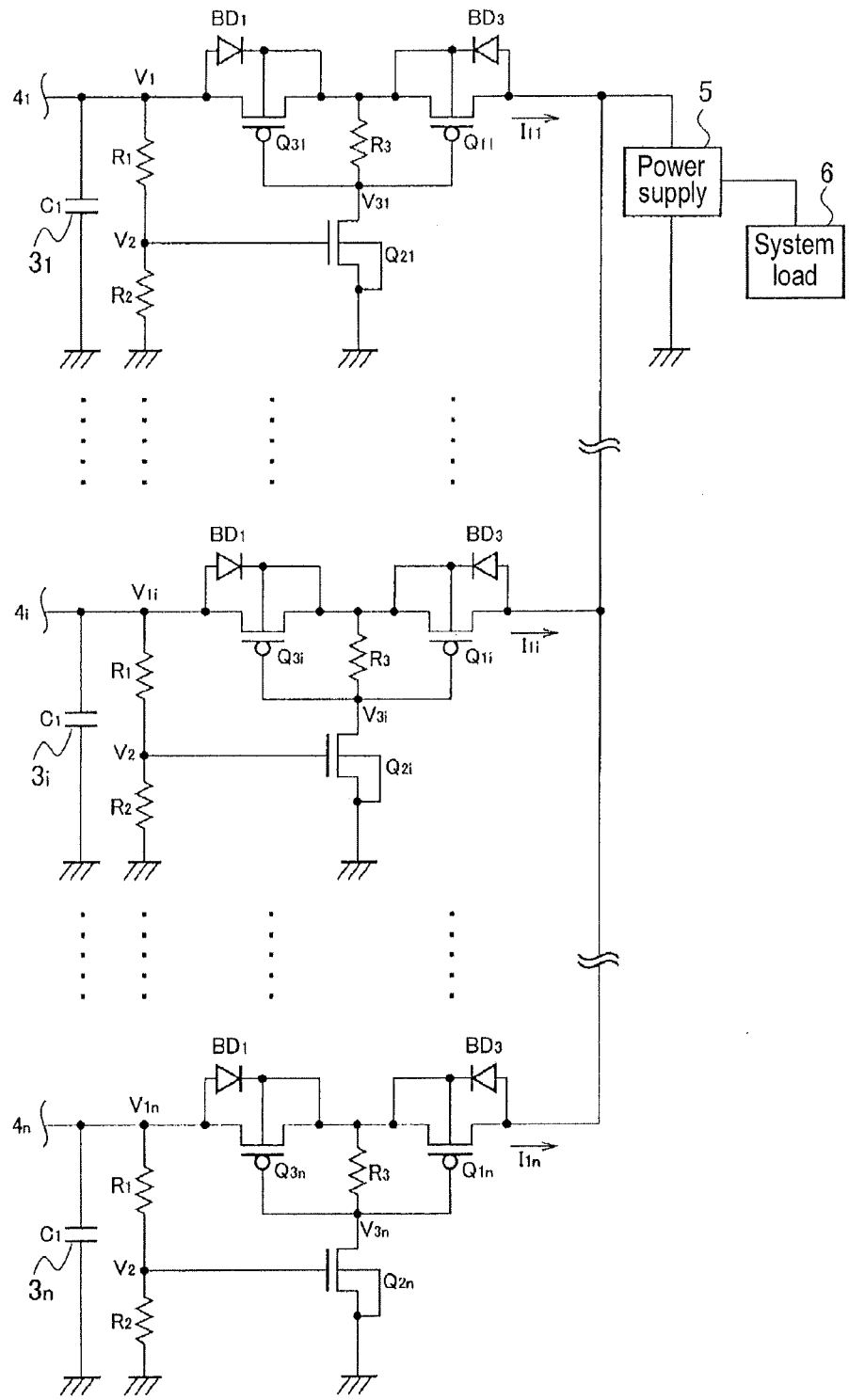
FIG. 14 is a detailed circuit diagram of the energy harvesting system according to the third embodiment.

FIG. 14 shows a detailed circuit configuration of the energy harvesting system 10c according to the third embodiment.

Figure 15:
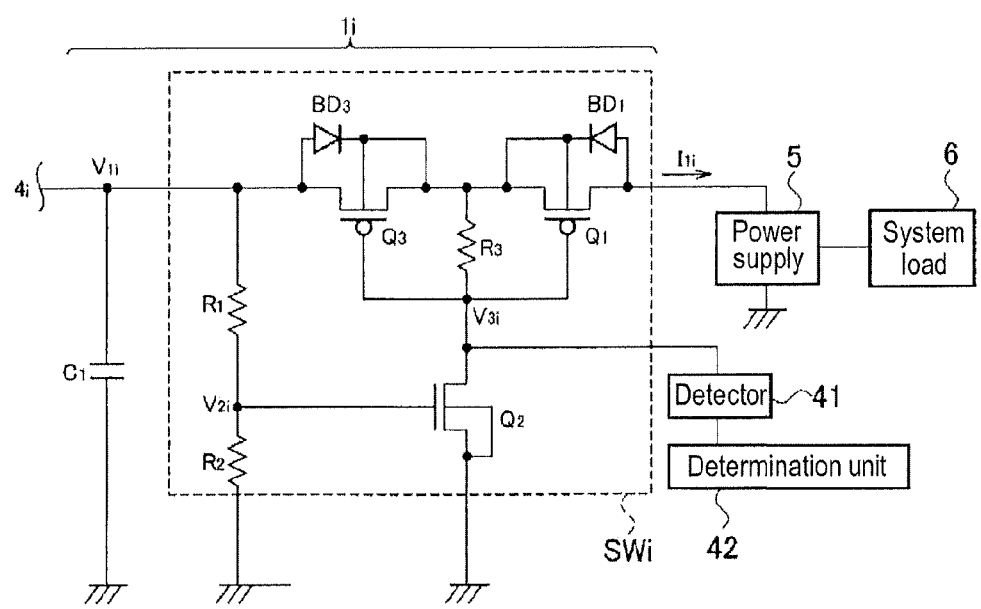
FIG. 15 is a schematic circuit block diagram used to explain a function to determine whether or not energy is supplied from any of a plurality of energy harvesting elements in the energy harvesting system according to the third embodiment.
Figure 16:
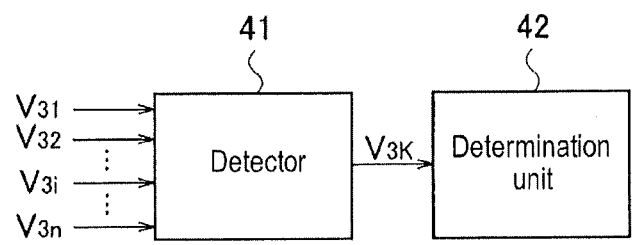
FIG. 16 is a schematic circuit block diagram used to explain an operation to determine whether or not energy is supplied from any of a plurality of energy harvesting elements in the energy harvesting system according to the third embodiment.

FIG. 15 is a schematic circuit block diagram used to explain a function to determine whether or not energy is supplied from any of the plurality of energy harvesting elements $4_1, \ldots, 4_i, \ldots, 4_n$ in the energy harvesting system 10c according to the third embodiment. FIG. 16 is a schematic block diagram used to explain an operation to determine whether or not energy is supplied from any of the plurality of energy harvesting elements $4_1, \ldots, 4_i, \ldots, 4_n$ in the energy harvesting system 10c according to the third embodiment.

A detector 41 detects drain voltages $V_{31}, \ldots, V_{3i}, \ldots, V_{3n}$ and selects a specific drain voltage $V_{3k}$ and a determination unit 42 determines whether or not the specific drain voltage $V_{3k}$ reaches the threshold voltage $V_{th2}$ of the second MOSFET $Q_2$. If the specific drain voltage $V_{3k}$ reaches the threshold voltage $V_{th2}$ of the second MOSFET $Q_2$, for example, it may be determined that identification information data $ID_k$ corresponding to the drain voltage $V_{3k}$ is 1. If the specific drain voltage $V_{3k}$ does not reach the threshold voltage $V_{th2}$, it may be determined that the identification information data $ID_k$ corresponding to the drain voltage $V_{3k}$ is 0.

As shown in FIGS. 15 and 16, the energy harvesting system 10c according to the third embodiment may include the detector 41 which is connected to the second drain of the second MOSFET $Q_2$ of the plurality of energy harvesting apparatuses $1_{11}, \ldots, 1_{1i}, \ldots, 1_{1n}$ and detects the drain voltages $V_{31}, \ldots, V_{3i}, \ldots, V_{3n}$, and the determination unit 42 to determine whether or not energy is supplied from any of the plurality of energy harvesting elements $4_1, \ldots, 4_i, \ldots, 4_n$ based on the drain voltages $V_{31}, \ldots, V_{3i}, \ldots, V_{3n}$ detected by the detector 41.

Figure 17A:
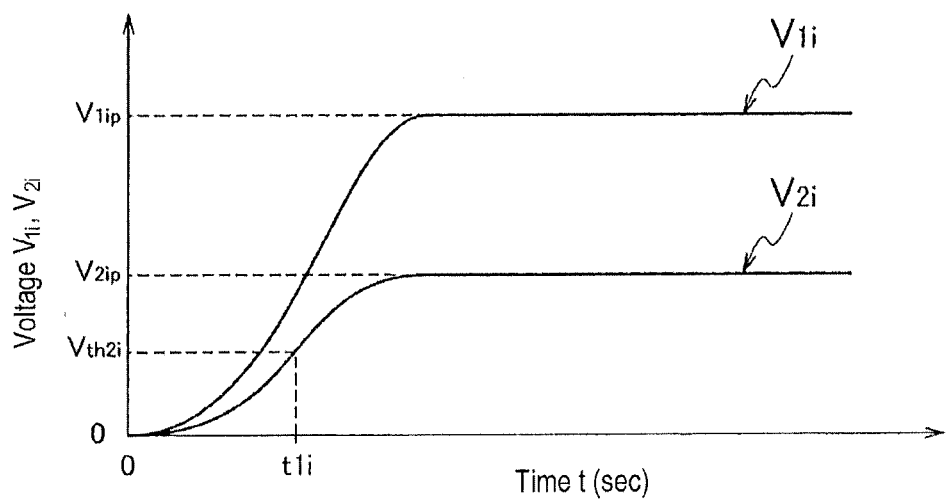
FIG. 17A is a view showing an operation waveform example of a capacitor voltage $V_{1i}$ and a gate voltage $V_{2i}$ in transition from an off state to an on state in an energy harvesting apparatus $1_i$ which can be applied to the energy harvesting system according to the third embodiment.
Figure 17B:
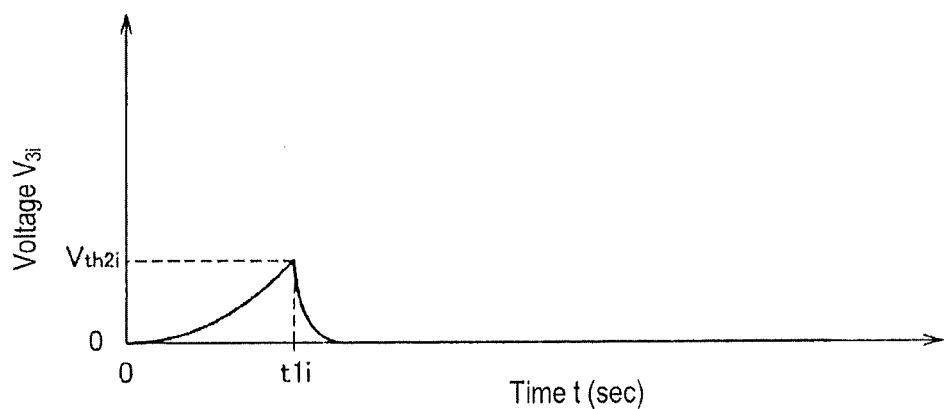
FIG. 17B is a view showing an operation waveform example of a drain voltage $V_{3i}$ in transition from an off state to an on state in an energy harvesting apparatus $1_i$ which can be applied to the energy harvesting system according to the third embodiment.
Figure 17C:
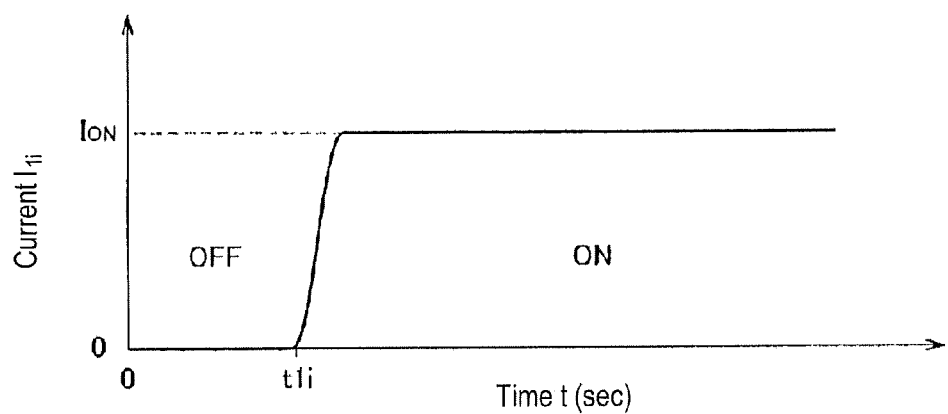
FIG. 17C is a view showing an operation waveform example of a current $I_{1i}$ supplied to a load in transition from an off state to an on state in an energy harvesting apparatus $1_i$ which can be applied to the energy harvesting system according to the third embodiment.

FIGS. 17A to 17C show an operation waveform example of a capacitor voltage $V_{1i}$ and a gate voltage $V_{2i}$, an operation waveform example of a drain voltage $V_{3i}$, and an operation waveform example of a current $I_{1i}$ supplied to a load, respectively, in transition from an off state to an on state in an energy harvesting apparatus $1_i$ which can be applied to the energy harvesting system 10c according to the third embodiment. FIGS. 17A to 17C are views used to explain an operation in a specific energy harvesting apparatus $1_i$ of the plurality of energy harvesting apparatuses $1_{11}, \ldots, 1_{1i}, \ldots, 1_{1n}$. These figures have substantially the same operation as FIGS. 7A to 7C and therefore, explanation thereof will not be repeated.

Figure 18A:
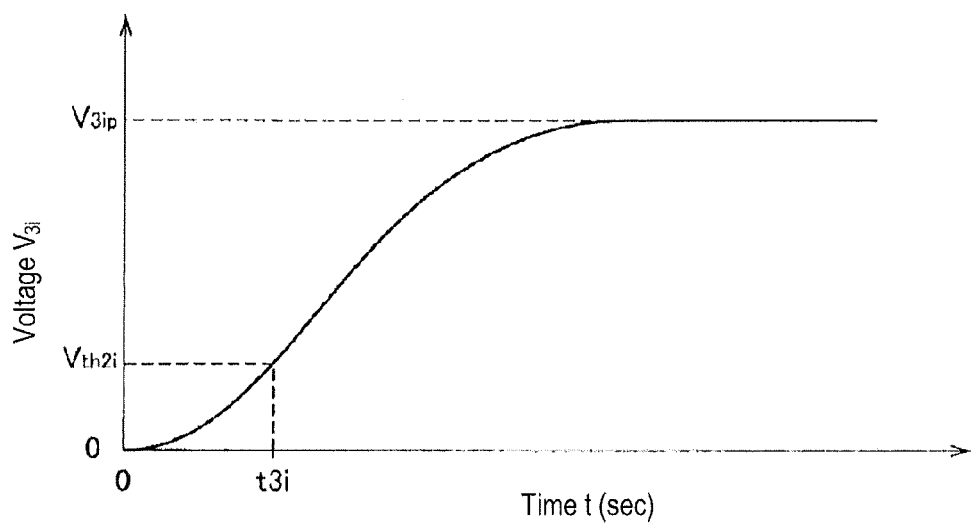
FIG. 18A is a view showing an operation waveform example of a drain voltage $V_{3i}$ in transition from an on state to an off state in an energy harvesting apparatus $1_i$ which can be applied to the energy harvesting system according to the third embodiment.
Figure 18B:
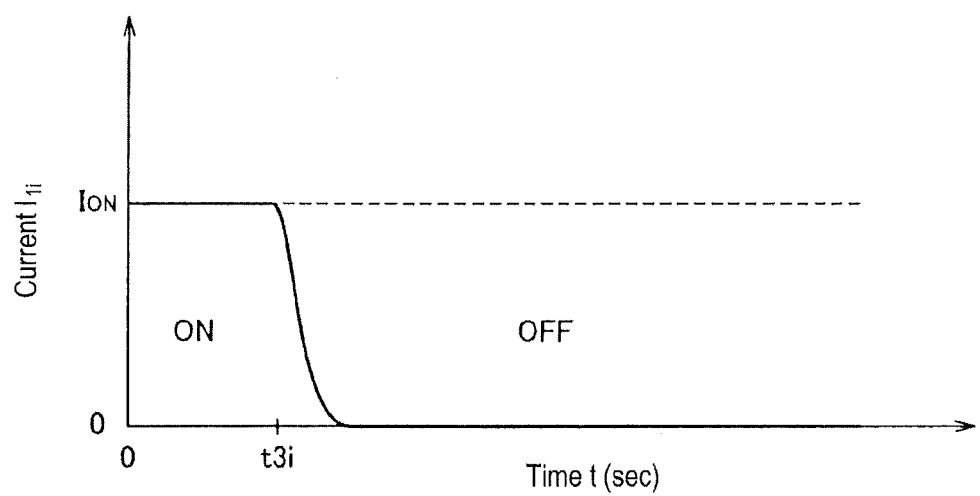
FIG. 18B is a view showing an operation waveform example of a current $I_{1i}$ supplied to a load in transition from an on state to an off state in an energy harvesting apparatus $1_i$ which can be applied to the energy harvesting system according to the third embodiment.

FIGS. 18A and 18B show an operation waveform example of a drain voltage $V_{3i}$ and an operation waveform example of a current $I_{1i}$ supplied to the loads, respectively, in transition from an on state to an off state in an energy harvesting apparatus $1_i$ which can be applied to the energy harvesting system 10c according to the third embodiment. FIGS. 18A and 18B are views used to explain an operation in a specific energy harvesting apparatus $1_i$ of the plurality of energy harvesting apparatuses $1_{11}, \ldots, 1_{1i}, \ldots, 1_{1n}$.

As shown in FIGS. 18A and 18B, the capacitor voltage $V_{1i}$ charged in the capacitor 3 decreases over time t. When the voltage $V_2$ becomes lower than the voltage $V_{th2}$ of the second MOSFET $Q_2$, the second MOSFET $Q_2$ is turned off, the drain voltage $V_{3i}$ becomes a potential $V_{3ip}$ of a high level higher than the voltage $V_{th2}$, and the first MOSFET $Q_1$ is turned off. As a result, as shown in FIG. 18B, the supply current $I_1$ to the load, which flows through the first MOSFET $Q_1$, is cut off to stop the supply of current to the loads.

If the energy harvesting elements $4_1, 4_i, \ldots, 4_n$ are arranged in parallel and one of them generates electricity, it is necessary to identify which of the energy harvesting elements $4_1, \ldots, 4_i, \ldots, 4_n$ supplies energy to the system load 6.

Therefore, in the third embodiment, it is possible to acquire identification data $ID_1, \ldots, ID_i, \ldots, ID_n$ for identifying which of the energy harvesting elements $4_1, \ldots, 4_i, \ldots, 4_n$ supplies energy to the system load 6, based on the drain voltages $V_{31}, \ldots, V_{3i}, \ldots, V_{3n}$ detected by the detector 41.

For example, if the drain voltage $V_{3i}$ reaches the threshold voltage $V_{th2}$ of the second MOSFET $Q_2$, as shown in FIG. 17B, it may be determined that ID, is 1. If the specific drain voltage $V_{3i}$ does not reach the threshold voltage $V_{th2}$, it may be determined that $ID_i$ is 0.

FIGS. 19A to 19D show a continuous operation waveform example of the capacitor voltage $V_{1i}$, a continuous operation waveform example of energy $E_{1i}$ stored in the capacitor $C_i$, a continuous operation waveform example of the supply current $I_{1i}$ to the loads, and a continuous operation waveform example of the drain voltage $V_{3i}$, respectively, in the energy harvesting system 10c according to the third embodiment. Although not shown, a continuous operation waveform example of the supply energy $E_L$ to the loads may be shown to correspond to FIG. 19C, like FIG. 10D corresponding to FIG. 10C.

Figure 19A:
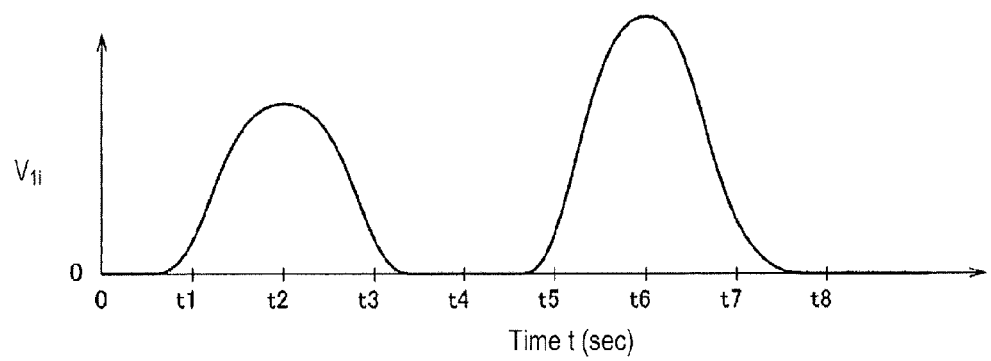
FIG. 19A is a view showing a continuous operation waveform example of a capacitor voltage $V_{1i}$ in the energy harvesting system according to the third embodiment.
Figure 19B:
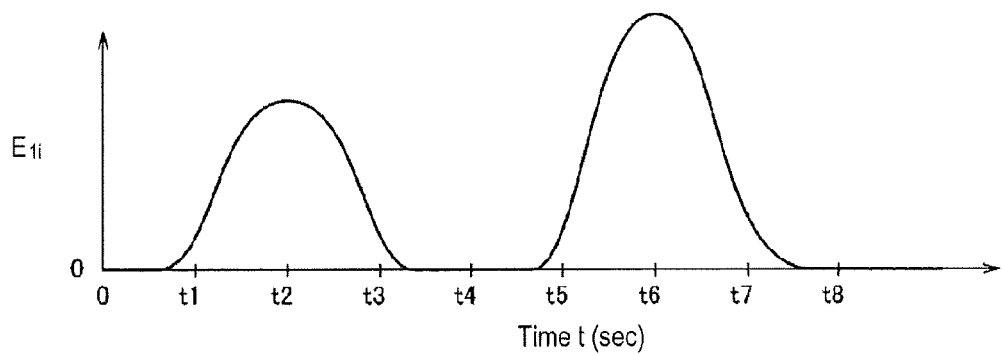
FIG. 19B is a view showing a continuous operation waveform example of energy $E_{1i}$ stored in a capacitor in the energy harvesting system according to the third embodiment.
Figure 19C:
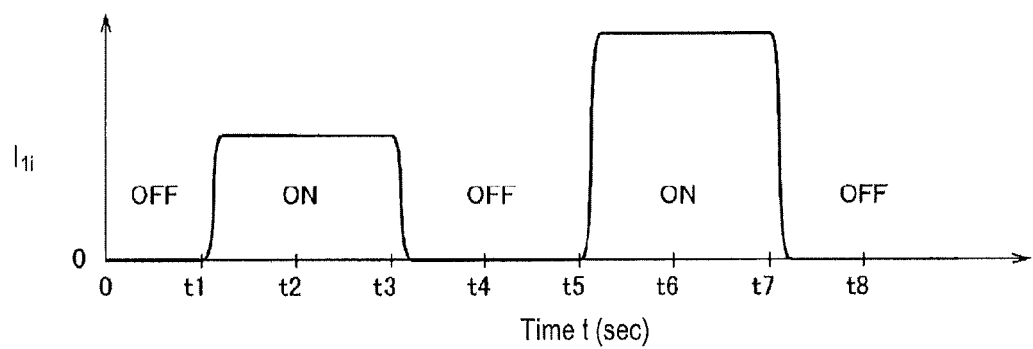
FIG. 19C is a view showing a continuous operation waveform example of a supply current $I_{1i}$ to a load in the energy harvesting system according to the third embodiment.
Figure 19D:
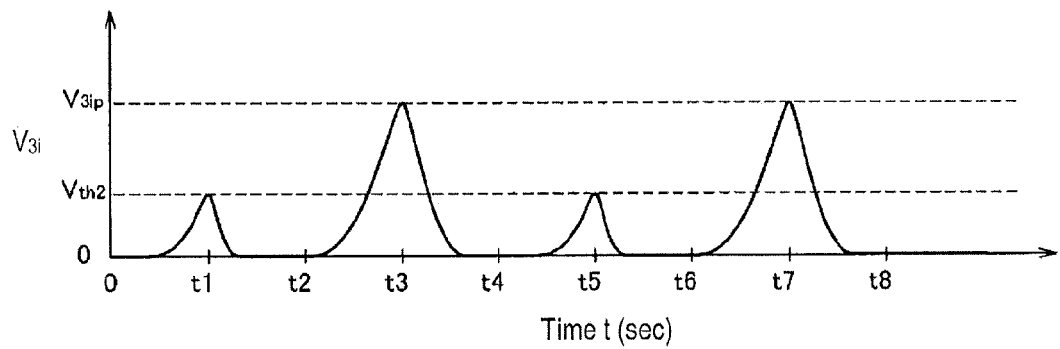
FIG. 19D is a view showing a continuous operation waveform example of a drain voltage $V_{3i}$ in the energy harvesting system according to the third embodiment.

The continuous waveform of the capacitor voltage $V_{1i}$ is varied as shown in FIG. 19A and the continuous operation waveform of the energy $E_{1i}$ stored in the capacitor $C_i$ is varied as shown in FIG. 19A. When the gate voltage $V_2$ becomes higher than the threshold voltage $V_{th2}$ of the second MOSFET $Q_2$, the second MOSFET $Q_2$ is turned on, the first MOSFET $Q_1$ is also turned on, and the supply current $I_{1i}$ to the loads becomes an ON-current $I_{ON}$ or higher. As a result, although not shown, the supply energy $E_L$ to the loads may be represented to correspond to FIG. 19C by the same continuous waveform example as that shown in FIG. 10D. In addition, as shown in FIG. 19D, the continuous waveform example of the drain voltage $V_{3i}$ is represented by a transient response waveform with the threshold voltage $V_{th2}$ of the first MOSFET $Q_1$ as a peak value in the transition from an off state to an on state, and is represented by a transient response waveform with the drain voltage $V_{3ip}$ determined by the circuit system of the switch SWi shown in FIG. 13 as a peak value in the transition from an on state to an off state.

With the energy harvesting system 10c according to the third embodiment, since energy can be supplied to the loads under a high impedance state after each capacitor 3 of the plurality of energy harvesting apparatuses $1_{11}, \ldots, 1_{1i}, \ldots, 1_{1n}$ provided to respectively correspond to the plurality of energy harvesting elements $4_1, \ldots, 4_i, \ldots, 4_n$ is sufficiently charged, the energy generated by the plurality of energy harvesting elements $4_1, \ldots, 4_i, \ldots, 4_n$ can be efficiently supplied to the loads. In addition, it is possible to identify a power generation state of a specific energy harvesting element $4_i$ of the energy harvesting elements $4_1, \ldots, 4_i, \ldots, 4_n$ based on a result of determination on the identification $ID_1, \ldots, ID_i, \ldots, ID_n$.

According to the third embodiment, it is possible to provide an energy harvesting apparatus and an energy harvesting system which are capable of supplying the energy generated by the plurality of energy harvesting elements with efficiency.

Other Embodiments

As described above, the present disclosure has been illustrated by way of the first to third embodiments, but the description and drawings which constitute a part of this disclosure are exemplary and should not be construed to limit the present disclosure. Various alternative embodiments, examples and operation techniques will be apparent to those skilled in the art from this disclosure.

Thus, it is to be understood that the present disclosure encompasses various embodiments which are not described herein. Therefore, the technical scope of the present disclosure is intended to be defined by only subject matter set forth in the claims pertinent to the detailed description.

The energy harvesting system of the present disclosure can be applied to systems for supplying energy generated by energy harvesting elements such as vibration power generating elements and so on with efficiency, for example, a wide range of fields including mobile devices, vehicles, industrial instruments, medical instruments, etc.

According to some embodiments of the present disclosure, it is possible to provide an energy harvesting apparatus and an energy harvesting system which are capable of supplying energy generated by an energy harvesting element with efficiency.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An energy harvesting apparatus comprising:
a capacitor configured to store energy generated by an energy harvesting element; and
a switch connected to the capacitor and configured to switch energy supply from the capacitor to a load based on a capacitor voltage with which the capacitor is charged,
wherein the switch includes:
a first MOSFET having a first source connected to the capacitor and a first drain connected to the load;
first and second resistors which are connected in parallel to the capacitor and divide the capacitor voltage;
a second MOSFET having a second drain connected to a first gate of the first MOSFET, a second gate connected to a voltage produced by the division of the capacitor voltage, and a second source connected to a ground potential; and
a third resistor connected between the first gate and the first source of the first MOSFET.

2. The energy harvesting apparatus of claim 1, wherein the resistor has a resistance equal to or higher than a predetermined impedance.

3. The energy harvesting apparatus of claim 1, wherein the switch further includes a third MOSFET which is interposed between the first source and the capacitor and has a third drain connected to the capacitor, a third source connected to the first source and a third gate connected to the first gate.

4. An energy harvesting system comprising:
an energy harvesting element;
the energy harvesting apparatus of claim 1, which is connected to the energy harvesting element; and
a load connected to the energy harvesting apparatus as an energy supply destination.

5. The energy harvesting system of claim 4, wherein the load includes:
a power supply; and
a system load which is connected to the power supply and consumes power.

6. The energy harvesting system of claim 5, wherein the power supply stabilizes a voltage supplied to the system load.

7. An energy harvesting system comprising:
a plurality of energy harvesting elements;
a plurality of energy harvesting apparatuses of claim 3, which are provided to respectively correspond to the plurality of energy harvesting elements; and
a load connected to the energy harvesting apparatuses as an energy supply destination.

8. The energy harvesting system of claim 7, wherein the load includes:
a plurality of power supplies respectively connected to the plurality of energy harvesting apparatuses; and
a system load which is connected in common to the plurality of power supplies and consumes power.

9. The energy harvesting system of claim 7, wherein the load includes:
a power supply which is connected in common to the plurality of energy harvesting apparatuses; and
a system load which is connected to the power supply and consumes power.

10. The energy harvesting system of claim 7, further comprising:
a detector connected to the second drain of the second MOSFET of each of the plurality of energy harvesting apparatuses and configured to detect a voltage of the second drain; and
a determination unit configured to determine whether or not energy is supplied from one of the plurality of energy harvesting elements based on the voltage of the second drain detected by the detector.

11. The energy harvesting system of claim 5, wherein the system load is one or more selected from a group consisting of a mobile device including a mobile phone, a smart phone, a PDA (Personal Digital Assistant), an optical disc device, a digital camera, or a wireless communication device, a vehicle, an industrial instrument, a medical instrument, and parts thereof.

12. The energy harvesting system of claim 8, wherein the system load is one or more selected from a group consisting of a mobile device including a mobile phone, a smart phone, a PDA (Personal Digital Assistant), an optical disc device, a digital camera, or a wireless communication device, a vehicle, an industrial instrument, a medical instrument, and parts thereof.

* * * * *